US012248393B2

(12) United States Patent
Dietrich et al.

(10) Patent No.: US 12,248,393 B2
(45) Date of Patent: Mar. 11, 2025

(54) AUTOMATED SOFTWARE TESTING

(71) Applicant: MICROSOFT TECHNOLOGY LICENSING, LLC, Redmond, WA (US)

(72) Inventors: Aaron Edward Dietrich, Kirkland, WA (US); Swamy V. P. L. N. Nallamalli, Bothell, WA (US); Timothy James Chapman, Bellevue, WA (US); Steve K. Lim, Redmond, WA (US); Levent Ozgur, Seattle, WA (US); Alex Pung Leung, Bellevue, WA (US); Taylor Paul Spangler, Kirkland, WA (US); Jareth Leigh Day, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 17/948,513

(22) Filed: Sep. 20, 2022

(65) Prior Publication Data

US 2023/0367699 A1 Nov. 16, 2023

Related U.S. Application Data

(60) Provisional application No. 63/341,791, filed on May 13, 2022.

(51) Int. Cl.
*G06F 11/36* (2006.01)
*G06F 11/3668* (2025.01)
(Continued)

(52) U.S. Cl.
CPC ........ *G06F 11/3664* (2013.01); *G06F 11/368* (2013.01); *G06F 11/3688* (2013.01); *G06N 3/08* (2013.01); *G06N 3/10* (2013.01)

(58) Field of Classification Search
CPC ........................... G06F 11/3688; G06F 11/368
(Continued)

(56) References Cited

U.S. PATENT DOCUMENTS 9,536,191 B1 1/2017 Arel et al.
9,792,397 B1 10/2017 Nagaraja
(Continued)

FOREIGN PATENT DOCUMENTS

CN 111949555 A * 11/2020 .......... G06F 11/3676
CN 115357501 A * 11/2022 .......... G06F 11/3684
(Continued)

OTHER PUBLICATIONS

"Get started with Robo tests", Retrieved from: https://web.archive.org/web/20220324090129/https://firebase.google.com/docs/test-lab/android/robo-ux-test, Mar. 24, 2022, 6 Pages.
(Continued)

*Primary Examiner* — Francisco J Aponte
(74) *Attorney, Agent, or Firm* — Shook Hardy & Bacon LLC

(57) ABSTRACT

The technology described herein provides an automated software-testing platform that functions in an undefined action space. The technology described herein starts with an undefined action space but begins to learn about the action space through random exploration. Both the action taken during testing and the resulting state may be communicated to a centralized testing service. The technology described herein also mines the action telemetry data and state telemetry data to identify action patterns that produce a sought after result. Once a plurality of action patterns is identified and, at least, a partial model of the action space is built, the testing on the test machines may be split into random test mode, replay test mode, and a pioneering test mode.

20 Claims, 9 Drawing Sheets

(51) Int. Cl.
*G06N 3/08* (2023.01)
*G06N 3/10* (2006.01)

(58) Field of Classification Search
USPC .......................................................... 717/135
See application file for complete search history.

(56) References Cited

U.S. PATENT DOCUMENTS

| | | | |
|---|---|---|---|
| 10,346,741 | B2 | 7/2019 | Mnih |
| 10,467,029 | B1 | 11/2019 | Lin |
| 10,733,501 | B2 | 8/2020 | Silver et al. |
| 10,783,056 | B2* | 9/2020 | Raviv ........................ G06F 8/33 |
| 10,802,864 | B2 | 10/2020 | Nag et al. |
| 10,805,185 | B2* | 10/2020 | Kolar ..................... G06F 11/362 |
| 10,891,219 | B1* | 1/2021 | Dimitropoulos ....... A63F 13/352 |
| 11,030,086 | B2* | 6/2021 | Tu ........................ G06F 11/3676 |
| 11,055,205 | B1* | 7/2021 | Chauhan ............. G06F 11/3684 |
| 11,068,378 | B2* | 7/2021 | Mola ................... G06F 11/3636 |
| 11,087,175 | B2 | 8/2021 | Kim |
| 11,188,528 | B1* | 11/2021 | Kostakis ............. G06F 11/0769 |
| 11,465,650 | B2 | 10/2022 | Saxena |
| 11,487,648 | B2* | 11/2022 | Amin .................. G06F 11/3692 |
| 11,520,675 | B2* | 12/2022 | Bryan ................. G06F 11/3075 |
| 11,558,265 | B1* | 1/2023 | Poornachandran .......................... G06F 9/45558 |
| 11,561,690 | B2* | 1/2023 | Lekivetz ............. G06F 3/04847 |
| 11,669,753 | B1 | 6/2023 | Gupta |
| 11,775,817 | B2 | 10/2023 | Brandt et al. |
| 11,790,239 | B2 | 10/2023 | Kour et al. |
| 11,853,901 | B2 | 12/2023 | Ko |
| 11,861,579 | B1 | 1/2024 | Capers |
| 11,889,819 | B2 | 2/2024 | Worth |
| 11,892,941 | B2 | 2/2024 | Rao Pandu |
| 11,989,119 | B2* | 5/2024 | Bhat ...................... G06N 20/20 |
| 12,001,320 | B2 | 6/2024 | Liu et al. |
| 12,066,920 | B2* | 8/2024 | Liu ....................... G06F 11/368 |
| 2009/0300423 | A1 | 12/2009 | Ferris et al. |
| 2018/0143891 | A1* | 5/2018 | Polisetty ................. G06F 9/542 |
| 2018/0197428 | A1 | 7/2018 | Baphna et al. |
| 2018/0260302 | A1* | 9/2018 | Mola ................... G06F 16/9038 |
| 2018/0293498 | A1 | 10/2018 | Campos et al. |
| 2018/0329788 | A1 | 11/2018 | Blum et al. |
| 2019/0188120 | A1* | 6/2019 | Luss .................... G06F 11/3688 |
| 2019/0286546 | A1 | 9/2019 | Johnston et al. |
| 2019/0287004 | A1* | 9/2019 | Bhoj ..................... H04L 43/065 |
| 2020/0117563 | A1* | 4/2020 | Eichhorn ............. G06F 11/3684 |
| 2020/0156243 | A1 | 5/2020 | Ghare et al. |
| 2020/0159644 | A1* | 5/2020 | Beltran ............... G06F 11/3476 |
| 2020/0167687 | A1 | 5/2020 | Genc |
| 2020/0278920 | A1 | 9/2020 | Khakare et al. |
| 2020/0299001 | A1* | 9/2020 | Restifo .................. G07C 5/008 |
| 2021/0021480 | A1* | 1/2021 | Puttur ..................... H04L 43/04 |
| 2021/0064515 | A1 | 3/2021 | Xu et al. |
| 2021/0073110 | A1 | 3/2021 | Vidal et al. |
| 2021/0187733 | A1 | 6/2021 | Lee |
| 2021/0232922 | A1 | 7/2021 | Zhang et al. |
| 2021/0279577 | A1* | 9/2021 | West ...................... G06N 3/045 |
| 2021/0334696 | A1 | 10/2021 | Traut et al. |
| 2021/0405727 | A1 | 12/2021 | Singh et al. |
| 2021/0406158 | A1* | 12/2021 | Yu ......................... G06F 11/368 |
| 2022/0050766 | A1* | 2/2022 | Tate .................... G06F 11/3608 |
| 2022/0222047 | A1* | 7/2022 | Todirel ...................... G06F 8/70 |
| 2023/0195601 | A1* | 6/2023 | Poornachandran .... G06N 20/00 717/124 |
| 2023/0297742 | A1 | 9/2023 | Wellens |
| 2023/0367696 | A1 | 11/2023 | Liu et al. |
| 2023/0367697 | A1 | 11/2023 | Liu et al. |
| 2023/0367703 | A1 | 11/2023 | Liu et al. |
| 2023/0394758 | A1 | 12/2023 | Fu |
| 2023/0418726 | A1* | 12/2023 | Migacz ..................... G06N 3/04 |
| 2023/0419113 | A1 | 12/2023 | Genc |
| 2024/0069907 | A1* | 2/2024 | Groenewegen ........... G06F 8/71 |
| 2024/0176726 | A1* | 5/2024 | Lemberg ............. G06F 11/0793 |
| 2024/0296107 | A1* | 9/2024 | Todirel ................ G06F 11/3624 |

FOREIGN PATENT DOCUMENTS

| | | | |
|---|---|---|---|
| EP | 3902314 A1 * | 10/2021 | ............. G06N 3/044 |
| WO | 2021058626 A1 | 4/2021 | |
| WO | 2021062226 A1 | 4/2021 | |

OTHER PUBLICATIONS

"Gym", Retrieved from: https://web.archive.org/web/20220415123137/https:/gym.openai.com/, Apr. 15, 2022, 3 Pages.

Microsoft, "ray-on-aml", Retrieved from: https://web.archive.org/web/20220418071031/https://github.com/microsoft/ray-on-aml/, Apr. 18, 2022, 7 Pages.

"RLlib: Industry-Grade Reinforcement Learning", Retrieved from: https://web.archive.org/web/20220418140512/https://docs.ray.io/en/latest/rllib/index.html, Apr. 18, 2022, 4 Pages.

"Stanford Research Institute Problem Solver", Retrieved from: https://en.wikipedia.org/wiki/Stanford_Research_Institute_Problem_Solver, Aug. 9, 2021, 4 Pages.

"UI/Application Exerciser Monkey", Retrieved from: https://web.archive.org/web/20220318102138/https://developer.android.com/studio/test/other-testing-tools/monkey, Mar. 18, 2022, 5 Pages.

Afridi, et al., "Deep Reinforcement Learning Approach for Inventory Policy Tested in Simulation Environment", In Proceedings of the Winter Simulation Conference, Dec. 14, 2020, 4 Pages.

Akkaya, et al., "Solving rubik's cube with a robot hand", In Repository of arXiv:1910.07113v1, Oct. 16, 2019, 51 Pages.

Amalfitano, et al., "Using gui ripping for automated testing of android applications", In Proceedings of the 27th IEEE/ACM International Conference on Automated Software Engineering, Sep. 3, 2012, pp. 258-261.

Anand, et al., "Automated concolic testing of smartphone apps", In Proceedings of the ACM SIGSOFT 20th International Symposium on the Foundations of Software Engineering, Nov. 11, 2012, pp. 1-11.

Andrychowicz, et al., "Hindsight experience replay", In Repository of arXiv:1707.01495v1, Jul. 5, 2017, 15 Pages.

Bengio, et al., "Curriculum learning", In Proceedings of the 26th Annual International Conference on Machine Learning, Jun. 14, 2009, pp. 41-48.

Blackmist, et al., "Reinforcement learning (preview) with Azure Machine Learning", Retrieved from: https://docs.microsoft.com/en-us/azure/machine-learning/how-to-use-reinforcement-learning, Apr. 1, 2022, 14 Pages.

Borges, et al., "Guiding app testing with mined interaction models", In Proceedings of IEEE/ACM 5th International Conference on Mobile Software Engineering and Systems, May 27, 2018, pp. 133-143.

Bridge, et al., "Event Tracing", Retrieved from: https://docs.microsoft.com/en-us/windows/win32/etw/event-tracing-portal, Jan. 8, 2021, 3 Pages.

Cao, et al., "Crawldroid: Effective model-based gui testing of android apps", In Proceedings of the Tenth Asia-Pacific Symposium on Internetware, Sep. 16, 2018, 6 Pages.

Chen, et al., "Learning action-transferable policy with action embedding", In Repository of arXiv preprint arXiv:1909.02291, May 10, 2021, 11 Pages.

Colas, et al., "Curious: Intrinsically motivated modular multi-goal reinforcement learning", In Repository of arXiv:1810.06284v1, Oct. 15, 2018, 9 Pages.

Gao, et al., "Android testing via synthetic symbolic execution", In Proceedings of 33rd IEEE/ACM International Conference on Automated Software Engineering, Sep. 3, 2018, pp. 419-429.

George, et al., "Microsoft UI Automation", Retrieved from: https://docs.microsoft.com/en-us/dotnet/framework/ui-automation/, Sep. 15, 2021, 2 Pages.

Graves, et al., "Automated curriculum learning for neural networks", In International conference on machine learning, Jul. 17, 2017, 10 Pages.

Halfin, et al., "Give feedback with the Feedback Hub", Retrieved from: https://docs.microsoft.com/en-us/windows-insider/feedback-hub/feedback-hub-app, Mar. 26, 2021, 13 Pages.

(56) References Cited

OTHER PUBLICATIONS

Harries, et al., "Drift: Deep reinforcement learning for functional software testing", In Proceedings of 33rd Deep Reinforcement Learning Workshop, Jul. 16, 2020, 10 Pages.
Hessel, et al., "Multi-task deep reinforcement learning with popart", In Proceedings of the AAAI Conference on Artificial Intelligence, Jul. 17, 2019, pp. 3796-3803.
Jamrozik, et al., "Droidmate: a robust and extensible test generator for android", In Proceedings of the International Conference on Mobile Software Engineering and Systems, May 14, 2016, pp. 293-294.
Li, et al., "Humanoid: A deep learning-based approach to automated black-box android app testing", In Proceedings of 34th IEEE/ACM International Conference on Automated Software Engineering, Nov. 11, 2019, pp. 1070-1073.
Liang, et al., "RLlib: Abstractions for distributed reinforcement learning", In Proceedings of International Conference on Machine Learning, Jul. 3, 2018, 10 Pages.
Lin, et al., "Test transfer across mobile apps through semantic mapping", In Proceedings of 34th IEEE/ACM International Conference on Automated Software Engineering, Nov. 11, 2019, pp. 42-53.
Machiry, et al., "Dynodroid: An input generation system for android apps", In Proceedings of the 9th Joint Meeting on Foundations of Software Engineering, Aug. 18, 2013, pp. 224-234.
Mahmood, et al., "Evodroid: Segmented evolutionary testing of android apps", In Proceedings of the 22nd ACM SIGSOFT International Symposium on Foundations of Software Engineering, Nov. 11, 2014, pp. 599-609.
Mao, et al., "Sapienz: Multiobjective automated testing for android applications", In Proceedings of the 25th International Symposium on Software Testing and Analysis, Jul. 18, 2018, pp. 94-105.
Mariani, et al., "Autoblacktest: Automatic black-box testing of interactive applications", In Proceedings of IEEE fifth international conference on software testing, verification and validation, Apr. 17, 2012, pp. 81-90.
Marshall, et al., "Application Verifier—Overview", Retrieved from: https://docs.microsoft.com/en-us/windows-hardware/drivers/devtest/application-verifier, Mar. 26, 2022, 8 Pages.
Marshall, et al., "Driver Verifier", Retrieved from: https://docs.microsoft.com/en-us/windows-hardware/drivers/devtest/driver-verifier, Dec. 15, 2021, 8 Pages.
Mnih, et al., "Playing Atari with Deep Reinforcement Learning", In Repository of arXiv:1312.5602v1, Dec. 19, 2013, 9 Pages.
Yazdanbakhsh, et al., "Massively Large-Scale Distributed Reinforcement Learning with Menger", Retrieved from: https://ai.googleblog.com/2020/10/massively-large-scale-distributed.html, Oct. 2, 2020, 6 Pages.
Mohammed, et al., "An empirical comparison between monkey testing and human testing (wip paper)", In Proceedings of the 20th ACM SIGPLAN/SIGBED International Conference on Languages, Jun. 23, 2019, pp. 188-192.
Narvekar, et al., "Curriculum learning for reinforcement learning domains: A framework and survey", In Journal of Machine Learning Research, vol. 21, Jul. 2020, pp. 1-50.
Pan, et al., "Reinforcement learning based curiosity-driven testing of android applications", In Proceedings of the 29th ACM SIGSOFT International Symposium on Software Testing and Analysis, Jul. 18, 2020, pp. 153-164.
Parisotto, et al., "Actormimic: Deep multitask and transfer reinforcement learning", In Repository of arXiv:1511.06342v1, Nov. 19, 2015, pp. 1-15.
Patel, et al., "On the effectiveness of random testing for android: or how i learned to stop worrying and love the monkey", In Proceedings of the 13th International Workshop on Automation of Software Test, May 28, 2018, pp. 34-37.
Portelas, et al., "Automatic Curriculum Learning For Deep RL: A Short Survey", In Repository of arXiv:2003.04664v2, May 28, 2020, 8 Pages.
Portelas, et al., "Teacher algorithms for curriculum learning of deep rl in continuously parameterized environments", In Conference on Robot Learning, Oct. 16, 2019, pp. 1-19.
Pouyanfar, et al., "A survey on deep learning: Algorithms, techniques, and applications", In Proceedings of ACM Computing Surveys, vol. 51, No. 5, Sep. 2018, 36 Pages.
Pritz, et al., "Jointly-Learned State-Action Embedding for Efficient Reinforcement Learning", In Proceedings of the 30th ACM International Conference on Information \& Knowledge Management, Nov. 1, 2021, pp. 1447-1456.
Resende, Pedro Tomas Mendes, "Reinforcement Learning of Task Plans for Real Robot Systems", In Thesis of Master of Science Degree in Electrical and Computer Engineering, Oct. 2014, 107 Pages.
Schulman, et al., "Proximal Policy Optimization Algorithms", In Repository of arXiv:1707.06347v2, Aug. 28, 2017, 12 Pages.
Zheng, et al., "Automatic Web Testing Using Curiosity-Driven Reinforcement Learning", In Repository of arXiv:2103.06018v1, Mar. 10, 2021, 13 Pages.
Shim, et al., "What are virtual machine scale sets?", Retrieved from: https://docs.microsoft.com/en-us/azure/virtual-machine-scale-sets/overview, Nov. 2, 2021, 5 Pages.
Spieker, et al., "Reinforcement learning for automatic test case prioritization and selection in continuous integration", In Proceedings of the 26th ACM SIGSOFT International Symposium on Software Testing and Analysis, Jul. 10, 2017, pp. 12-22.
"Non-Final Office Action Issued in U.S. Appl. No. 17/854,640", Mailed Date: Oct. 30, 2023, 19 Pages.
"Non Final Office Action Issued in U.S. Appl. No. 17/855,434", Mailed Date: Oct. 10, 2023, 8 Pages.
Cao, et al., "Automatic HMI Structure Exploration Via Curiosity-Based Reinforcement Learning", In Proceedings of IEEE/ACM International Conference on Automated Software Engineering, Nov. 15, 2021, pp. 1151-1155.
Huurman, et al., "Generating API Test Data Using Deep Reinforcement Learning", Proceedings of the IEEE/ACM 42nd International Conference on Software Engineering Workshops, Sep. 25, 2020, pp. 541-544.
Non-Final Office Action mailed on Feb. 9, 2024, in U.S. Appl. No. 17/855,240, 20 pages.
Notice of Allowance mailed on Feb. 6, 2024 in U.S. Appl. No. 17/855,434, 10 Pages.
Pang, et al., "A simulator for reinforcement learning training in the recommendation field," IEEE International conference on Parallel and Distributed Processing with Applications, 2020, 06 Pages.
Catovic, et al., "Linnaeus: A highly reusable and adaptable ML Based Log Classification Pipeline", In Repository of arXiv:2103.06927v1, Mar. 11, 2021, 8 Pages.
Collins, et al., "Deep Reinforcement Learning based Android Application GUI Testing", In Proceedings of Cyber Security Experimentation and Test Workshop, Sep. 21, 2017, pp. 186-194.
"International Search Report and Written Opinion Issued in PCT Application No. PCT/US23/015988", Mailed Date: Jun. 28, 2023, 14 Pages.
"International Search Report and Written Opinion Issued in PCT Application No. PCT/US23/017013", Mailed Date: Jun. 30, 2023, 14 Pages.
Eskonen, et al., "Automating GUI Testing with Image-Based Deep Reinforcement Learning", In Proceedings of IEEE International Conference on Autonomic Computing and Self-Organizing Systems, Aug. 17, 2020, pp. 160-167.
"International Search Report and Written Opinion Issued in PCT Application No. PCT/US23/013377", Mailed Date: Jun. 12, 2023, 11 Pages.
"International Search Report and Written Opinion Issued in PCT Application No. PCT/US23/013378", Mailed Date: Jun. 7, 2023, 13 Pages.
Romdhana, et al., "Deep Reinforcement Learning for Black-Box Testing of Android Apps", In Repository of arXiv:2101.02636v1, Jan. 7, 2021, 26 Pages.
Zheng, et al., "Wuji: Automatic online combat game testing using evolutionary deep reinforcement learning", In Proceedings of 34th

(56) References Cited

OTHER PUBLICATIONS

IEEE/ACM International Conference on Automated Software Engineering, Nov. 11, 2019, pp. 772-784.
Su, et al., "Guided, stochastic model-based GUI testing of android apps", In Proceedings of 11th Joint Meeting on Foundations of Software Engineering, Sep. 4, 2017, pp. 245-256.
Sutton, et al., "Reinforcement Learning: An Introduction", In Publication of The MIT Press, Jan. 1, 2018, 444 Pages.
Terry, J K., "Using PettingZoo with RLlib for Multi-Agent Deep Reinforcement Learning", Retrieved from: https://towardsdatascience.com/using-pettingzoo-with-rllib-for-multi-agent-deep-reinforcement-learning-5ff47c677abd, Sep. 25, 2021, 16 Pages.
Notice of Allowance mailed on Mar. 13, 2024, in U.S. Appl. No. 17/855,434, 02 pages.
Final Office Action mailed on Jun. 17, 2024, in U.S. Appl. No. 17/855,240, 23 pages.
Kuznetsov, et al., "Automated Software Vulnerability Testing Using Deep Learning Methods", IEEE,2019, pp. 837-841.
Nguyen, et al., "Prioritizing automated user interface tests using reinforcement learning", ACM, 2019, 10 pages.
Notice of Allowance mailed on Apr. 15, 2024, in U.S. Appl. No. 17/854,640, 14 pages.
Notice of Allowance mailed on Jul. 11, 2024, in U.S. Appl. No. 17/854,640, 5 pages.
May 13, 2022 U.S. Appl. No. 63/341,791.
U.S. Appl. No. 63/341,791, filed May 13, 2022.
Non-Final Office Action mailed on Oct. 31, 2024, in U.S. Appl. No. 17/855,240, 24 pages.

\* cited by examiner

600

RECEIVE A TIME-SEQUENCE OF EVENTS FROM TESTING A FIRST VERSION OF A SOFTWARE, WHEREIN AN EVENT WITHIN THE TIME-SEQUENCE OF EVENTS COMPRISES AN ACTION AND RESULTING STATE PRODUCED BY THE ACTION WITHIN THE FIRST VERSION OF THE SOFTWARE
610

IDENTIFY, WITHIN THE TIME-SEQUENCE OF EVENTS, AN EVENT PATTERN THAT PRODUCED A SPECIFIC STATE THAT SATISFIES A SPECIFIC REWARD CRITERION
620

INSTRUCT A FIRST PLURALITY OF TEST INSTANCES TO TEST A SECOND VERSION OF THE SOFTWARE BY REPRODUCING THE EVENT PATTERN
630

*FIG. 6.*

AUTOMATED SOFTWARE TESTING

CROSS-REFERENCE TO RELATED APPLICATIONS

This application claims the benefit of U.S. Provisional Application No. 63/341,791, filed May 13, 2022, which is incorporated herein by reference in its entirety.

BACKGROUND

Automated software testing for complex environments, such as operating systems or the applications running thereon, should simulate the broad diversity of ways that users interact with the software being tested. Simulated usage during testing allows for detection of bugs before they turn into usability or security issues after deployment. Simulated usage attempts to test representative scenarios that are known to reveal bugs, while providing enough variety to push the software being tested and the operating system into a broad range of plausible states. Similarly, automated testing should test as many possible interaction scenarios as possible.

SUMMARY

The technology described herein provides an automated software-testing platform that functions in an undefined action space. The action space is the set of all actions that the testing platform may take on the software being tested. In an undefined action space, the actions available to the testing platform outside of the current software state are unknown to the testing platform. A state is a description of software and machine conditions at a point in time. For example, a software state includes visible interface objects. Interacting with an interface object may produce a second state with different visible interface objects.

The technology described herein starts with an undefined action space, and learns about the action space through random exploration. The random exploration is performed by a plurality of test machines running instances of the software being tested. Both the action taken and the resulting state are communicated to a centralized testing service. The centralized testing service may then build a model of the action space using the action telemetry data and state telemetry data. The model of the action states are built by combining telemetry data received from the plurality of test machines conducting the testing.

The technology described herein also mines the action telemetry data and state telemetry data to identify action patterns that produce a desired result. Action telemetry data describes an input to a computer system, such as a keyboard stroke, mouse click, or touchscreen input. During use, a user typically provides the input. During testing, the inputs are simulated. State telemetry data describes the state of the software and/or machine on which the software is running. The desired result is defined by specified state conditions that reflect achieving the desired result. In one example, the desired states are unhealthy states, such as a crash, a hang, exception, an assertion error, or the surfacing of any error message. In another aspect, the desired states represent scenario completions, such as the completion of a task within the software being tested.

In aspects, machine-learning models are used to identify patterns within the action telemetry data and state telemetry data that produce the desired result associated. The pattern is identified from a large sequence of action and resulting state pairs. An action and a resulting state are described as an event herein. When correctly identified, the pattern will include actions required to produce the desired result without unrelated actions. Once identified, the patterns may be used for replay testing in the same or different version of the software.

Once a plurality of action patterns is identified and, at least, a partial model of the action space is built, the testing on the test machines may be split into different modes. A first portion of machines may be allocated to continue random testing, which serves an exploration function. A second portion of the machines may be allocated to replay testing, which seeks to replay identified action patterns that produce the desired result. A third portion of machines may be allocated to pioneer testing. Pioneer testing performs random actions, except that the random actions are directed to an unexplored portion of the action space. Additional portions may be devoted to running action patterns generated through computationally-derived action patterns, derived from heuristics, statistical methods, or machine learning algorithms.

BRIEF DESCRIPTION OF THE DRAWINGS

The methods and systems disclosed herein are described in detail below with reference to the attached drawing figures, wherein:

FIG. 6 is a flow chart illustrating an example software testing method, in accordance with aspects of the technology described herein;

DETAILED DESCRIPTION

Figure 1:
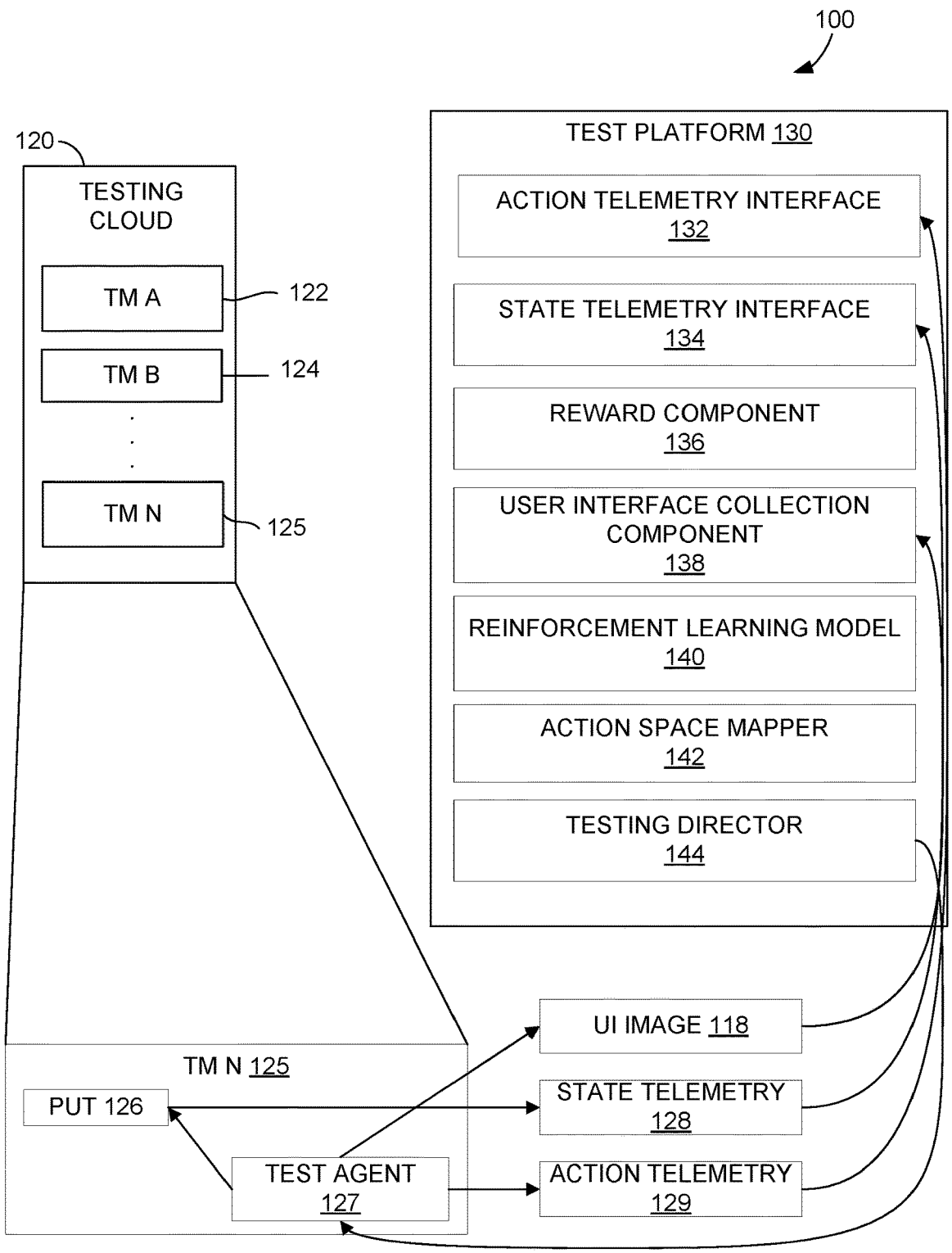
FIG. 1 is a block diagram of an example software testing environment, in accordance with aspects of the technology described herein.

The technology described herein provides an automated software-testing platform that functions in an undefined action space. The action space is the set of all actions that the testing platform may take on the software being tested. When testing user interface features, an action is an interaction with a user interface element (e.g., button, menu). In an undefined action space, the actions available to the testing platform outside of the current state are initially unknown to the testing platform. A state is a description of software and machine conditions at a point in time. For example, a software state includes visible interface objects. Further, in an undefined action space, the programmed state change that should result (e.g., bolding text, having typed text enter a box, dismissing a dialog box) from taking available actions from the current state is also unknown to the testing platform. This is in contrast to many existing testing systems that require a developer to provide a defined action space to facilitate testing.

Previous systems rely on heuristically driven methodologies, such as generating random events or machine learning-based approaches to navigate user interfaces. Despite the adoption of these methodologies in testing, limitations still exist. For example, some machine-learning based models only exploit historically observed paths during testing, where in many cases bugs or scenarios are found in paths that have not been observed before. Existing machine-learning models do not effectively learn how to follow paths that are different from previously observed paths. The technology described herein starts with an undefined action space but begins to learn about the action space through random exploration. The random exploration is performed by a plurality of test machines running instances of the software being tested. Each test machine includes a testing agent that performs actions on the software being tested. In random exploration mode, the testing agent receives information about the current state of the software. In one aspect, the state information is provided by an accessibility function built into the software and/or the operating system running on the test machine. The state information for the current state of the software identifies user interface elements that may be interacted with from the current state. The state information for the current state may also include the type of interaction each component is able to receive. The testing agent then randomly selects a user interface element to interact with and, if multiple interaction types are possible, selects an interaction type. The selected interaction type is then implemented on the selected user interface element to change the state of the software being tested. Both the action taken and the resulting state are communicated to a centralized testing service. The action taken is described herein as part of action telemetry data, while the resulting state is described as part of state telemetry data. The centralized testing service may then build a model of the action space using the action telemetry data and state telemetry data. The model of the action states is built by combining telemetry data received from the plurality of test machines conducting the testing.

The technology described herein also mines the action telemetry data and state telemetry data to identify action patterns that produce a desired result. Action telemetry data describes an input to a computer system, such as a keyboard stroke, mouse click, or touchscreen input. During use, a user typically provides the input. During testing, the inputs are simulated. State telemetry data describes the state of the software and/or machine on which the software is running. The desired result is defined by specified state conditions that reflect achieving the desired result. In one example, the desired states are unhealthy states, such as a crash, a hang, exception, an assertion error, or the surfacing of any error message. In another aspect, the desired states represent scenario completions, such as the completion of a task within the software being tested.

A task may be taking a picture, entering text, bolding text, or any number of other possible tasks. Many of these tasks require a sequence of multiple actions. For example, a complex task could require opening a menu, selecting a menu item, providing input, and then selecting the enter button. In contrast, simply opening a menu interface and then randomly closing the same user interface is an example of failing to complete a scenario. Again, the desired state is defined by a reward criteria and assigned a reward value when produced by the testing agent.

Machine learning methods may be used to identify patterns within the action telemetry data and state telemetry data that produce the desired result associated. The pattern may be identified from a large sequence of action and resulting state pairs. An action and a resulting state are described as an event herein. When correctly identified, the pattern will include actions required to produce the desired result without unrelated actions. Once identified, the patterns may be used for replay testing in the same or different version of the software.

Replay testing is different from random testing. In replay testing, the testing agent attempts to take the actions associated with an identified pattern and determines what state will result. For example, when an action pattern is associated with production of an unhealthy state, the replay seeks to reproduce this pattern to determine whether a bug that produced the unhealthy state has been fixed. In other cases, the action patterns represent realistic actions that a real user may take. For example, a real user is unlikely to randomly open and close the same menu as might happen with random testing. Instead, the real user is likely to open the menu and attempt to perform actions available through the menu. Attempting to complete a realistic scenario is generally considered a better use of testing resources because it provides coverage for scenarios a user is likely to attempt.

Once a plurality of action patterns is identified and at least a partial model of the action space is built, the testing on the test machines may be split into different modes. Once a plurality of action patterns is identified and, at least, a partial model of the action space is built, the testing on the test machines may be split into different modes. A first portion of machines may be allocated to continue random testing, which serves an exploration function. A second portion of the machines may be allocated to replay testing, which seeks to replay identified action patterns that produce the desired result. A third portion of machines may be allocated to pioneer testing. Pioneer testing performs random actions, except that the random actions are directed to an unexplored portion of the action space. For example, an available user interface element that has not previously been interacted with through the random testing is selected as a starting point for pioneer testing. Pioneer testing helps ensure coverage for all aspects of a software being tested. Additional portions may be devoted to running action patterns generated through computationally-derived action patterns, derived from heuristics, statistical methods, or machine learning algorithms.

In aspects, the replay testing is implemented on a second version of the software in which the action pattern was identified. For example, when a bug is detected during random testing of the first version of the software, then the pattern that produces the bug is identified. Presumably, developers attempted to fix the bug and issued a second version of the software. The replay testing will then attempt to perform the pattern that revealed the bug in the second version of the software.

The technology described herein improves upon existing testing technology in several ways, including by making efficient use of computer resources. The goal is to use the least amount of resources to find the highest number of problems in the software being tested. The technology described herein takes the software being tested and reward criteria as the primary inputs, without requiring the action space to be defined. In contrast, many existing technologies also require the action space to be defined as part of the input. Many existing technologies also receive various action patterns to guide the testing. These inputs are typically provided with the goal of making efficient use of the testing resources and to provide high effectiveness. However, errors in the provided action space or action patterns reduce the effectiveness of current testing methods by causing areas of the software to be omitted from testing (if part of the action space is missing) or for testing errors to occur if the action space includes portions not in the actual software. These input errors may occur as various versions of the software progress without corresponding updates being made to the testing inputs.

The technology described herein maintains high efficiency and effectiveness without using these same inputs. As a result, the technology described herein also avoids ineffectiveness caused by errors in the action space or action patterns typically provided as input. As described above, the technology described herein learns the action space and meaningful action patterns. As the system learns, more testing resources may be used to test known spaces and known patterns and less resources dedicated to exploration.

Automated Testing Environment

Turning now to FIG. 1, an example software-testing environment 100 is shown, according to an aspect of the technology described herein. Among other components not shown, the software-testing environment 100 includes a testing cloud 120 with test machine (abbreviated TM in FIG. 1) A 122, test machine B 124, and test machine N 125, and test platform 130, all connected by a computer network. It should be understood that this and other arrangements described herein are set forth only as examples. Other arrangements and elements (e.g., machines, interfaces, functions, orders, and groupings of functions) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Each of the components shown in FIG. 1 may be implemented via any type of computing device, such as computing device 900 described in connection to FIG. 9. These components may communicate with each other via a network, which may include one or more local area networks (LANs) and/or wide area networks (WANs). In example implementations, a network comprises the Internet and/or a cellular network, amongst any of a variety of possible public and/or private networks.

Moreover, these components, functions performed by these components, or services carried out by these components may be implemented at appropriate abstraction layer (s), such as the operating system layer, application layer, hardware layer, etc., of the computing system(s). Alternatively, or in addition, the functionality of these components and/or the aspects of the technology described herein may be performed, at least in part, by one or more hardware logic components. For example, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in software-testing environment 100, it is contemplated that in some aspects functionality of these components is shared or distributed across other components.

The technology described herein includes a framework in which the agent interacts with a plurality of test machines (e.g., 30, 60, 100, 1000) simultaneously to collect test data. Each test machine 125 has an operating system and software being tested 126 (e.g., MICROSOFT WORD) pre-installed. The testing agent 127 opens the software being tested 126 (abbreviated SBT in FIG. 1) and starts to interact with the software being tested via a test interface. The testing agent 127 observes the current state within the environment, takes an action, and observes the next state.

The testing cloud 120 includes test machine A 122, test machine B 124, and test machine N 125. The N designation on test machine N 125 is intended to indicate that any number of test machines may be used in the testing cloud 120. Each test machine includes software being tested along with a simulated computing environment, including an operating system. A test machine may be a virtual machine or a physical machine. The testing director 144 may assign different test types to different machines. For example, a first group of machines may do random walk testing, while a second group follows action patterns predicted by the pattern detector 140 to complete a task. A third group may perform pioneering exploration, which is directed to exploring previously unexplored, and thus unknown areas of the action space.

The test platform 130 includes an action telemetry interface 132, state telemetry interface 134, reward component 136, the event sequence builder 138, the pattern detector 140, the action space mapper 142, and the testing director 144.

The action telemetry interface 132 receives action telemetry data 129 from the testing agent 127 running on the plurality of test machines. The action telemetry data 129 includes descriptions of actions (alternatively described simply as "actions") the various testing agents took on the test machines. Actions include all possible interactive actions with the software interface. In other words, actions are any action (e.g., select, hover, enter text) a user may perform with an interface element (e.g., button, menu, text box). In one aspect, the actions are determined through interrogation of an accessibility layer (e.g., the MICROSOFT User Interface (UI) Automation System). The accessibility layer or function framework are used by applications, like screen readers, for low vision users. The number of available actions for each state may be dynamic. Some software applications have a very large action space. For example, some applications have 100,000 or more actions. During testing, the identified actions may be stored in a database. In one aspect, the identified actions are stored in a multi-model database service, such as a key-value store.

The state telemetry interface 134 receives state telemetry data 128 from the software being tested 126. The state telemetry data 128 includes new interface elements presented in response to the action along with other changes (e.g., content changes) made to the interface. The state telemetry data may also include system and software health information, such as whether the system crashed, hung, or the like. In some aspects, the state telemetry data takes the form of an image of the UI that resulted from an action. Taking an image of the UI is resource intensive and it may not be an efficient practice to collect an image for each test action. In aspects, UI images are collected during action replay when the pattern being replayed is associated with confidence score that is above a threshold score. The selective collection of UI images conserves resources required to capture and store the UI images. In aspects, the confidence score threshold could be 0.7, 0.8, and/or 0.9. The confidence score indicates a confidence that the pattern is correctly identified by the pattern detector 140.

The reward component 136 evaluates a newly achieved state and assigns a reward. The reward is then associated with the state and the action that produced the state. A goal is to test functionality as users experience it in applications and in an operating system shell. The reward function may be formulated differently in different experiments. In a first aspect, a positive reward is triggered if the action taken by the agent matches a target action (e.g., when the agent takes the actions of clicking the Bold button or clicking the Font button from the menu bar) or achieves a target state. The action and/or state and associated reward may be provided as training data.

The testing system recognizes when a desired state is achieved by comparing a new state to a reward criteria. In one example, the desired states represent scenario completions, such as the completion of a task within the software being tested. A task may be, for example, taking a picture, entering text, bolding text, or any number of other possible tasks. Many of these tasks require a sequence of multiple actions, as described above.

The event sequence builder 138 matches the action to the resulting state. The matching is done by comparing time stamps on the action to time stamps on the state. The time stamp associated with the action and the time stamp associated with resulting state may not match exactly. In an aspect, a resulting state is associated with a last action performed prior to the resulting state.

The pattern detector 140 identifies patterns that produce a desired state. A pattern of actions is the steps taken to perform a task, such as changing the font color to red. In order to change the font color to red, the steps may include opening a document, selecting text, opening the font menu, and selecting red from available font colors. Note that different paths for performing the same task may be available. For example, in MICROSOFT WORD, the font color menu may be found on a task ribbon, automatically by selecting text, or through a drop down menu. Thus, at least three different patterns for changing font color are available. It may be desirable to find and test each pattern during testing.

Figure 4:
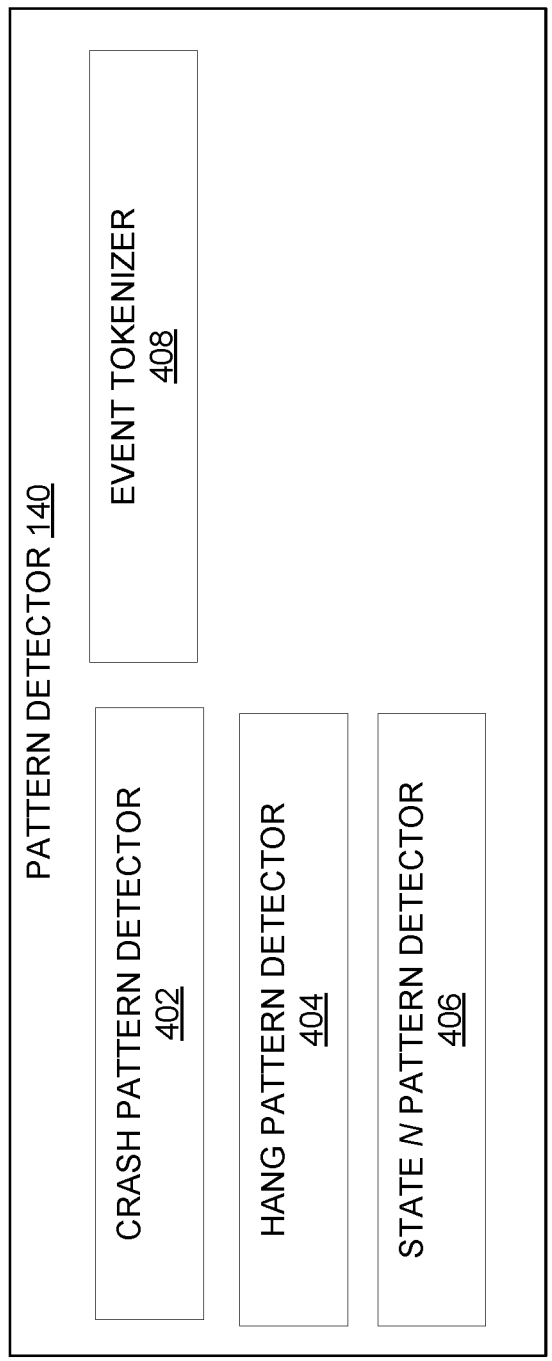
FIG. 4 is a block diagram of an example pattern recognition system, in accordance with aspects of the technology described herein.

As shown in FIG. 4, the pattern detector 140 includes several different machine-learning models trained to identify patterns that produce rewards. Different systems may be used to detect different types of patterns. For example, a crash pattern detector 402 is trained to detect patterns that cause crashes, while the hang pattern detector 404 is trained to detect patterns that cause hangs. The State N pattern detector 406 is trained to detect state N, meaning any other defined state. Each state may have its own detector, though a single detector may be trained to detect multiple states with similar patterns. Different machine learning models may be used to detect longer or shorter patterns. For example, natural language processing may be used to detect longer patterns, while machine-learning models that evaluate the frequency and uniqueness of actions may be used to detect shorter patterns. In an aspect, longer patterns require five or more actions to produce a reward. In an aspect, shorter patterns require four or less actions to produce a reward.

In embodiments, a vectorization technique that indicates the importance of a particular action or pattern is used in a detection approach for shorter patterns. For example, in a first detection approach for shorter patterns, the technology described herein scores the importance of an action sequence to a reward by customizing the Term Frequency-Inverse Document Frequency (TF-IDF) technique from the information retrieval domain. TF-IDF determines how frequently various actions and/or patterns of actions occur within the observed actions. Actions that occur frequently, but are not often associated with a reward tend to be excluded from an identified pattern, especially at the start of the pattern. Conversely, the actions that are more frequently associated with a reward tend to be included. Additionally, unique actions occurring close to an action that produced the reward are more likely to be included in the identified pattern.

To learn longer sequences of actions, the technology described herein may use a word embedding model (e.g., Word2Vec, Global Vectors for Word Representation (GloVe), fastText) with skip-grams to identify longer windows (e.g., of up to 50 actions). A word embedding is a representation of words in the form of a vector that encodes the meaning of the word such that words that are closer in the vector space are expected to be similar in meaning. From there, the technology described herein may look at the top actions for each reward and filter to the top five patterns containing the most highly correlated actions in them. Longer windows of actions are required to perform some tasks. For example, a UI element may be inactive (e.g., greyed-out) in a first user interface, and thus, not capable of interaction. In an example, activating the UI element may require navigating a settings menu and changing a setting and then returning to the UI in which the now-active UI element is located.

The word-embedding model may use a neural network model to learn word associations from a large corpus of text. Once trained, such a model typically detects synonymous words or suggest additional words for a partial sentence. The actions in the action telemetry data are not words and are not "natural language." Nevertheless, natural language processing techniques, are adapted as described herein to identify action patterns. In contrast to typical natural language evaluation, the word-embedding model may be configured to only evaluate actions occurring before an action that produced a reward. This configuration prevents evaluation of tokens occurring after the action that produced the reward because subsequent actions will not be included in the pattern by definition. This contrasts with typical natural language processing where words occurring after a particular word add context and meaning.

As a pre-processing step, the actions or events (action/state combination) are tokenized by the event tokenizer 408. The event tokenizer 408 assigns token identifiers to each action or event. The token identifier assigned is based on attributes of the action and/or resulting state. Thus, similar actions receive similar (e.g., numerically close) token identifiers. For example, a first action of hovering over a first button should receive a similar token identifier as a second action of selecting the first button.

In this example, the training data includes labeled action patterns and action sequences that do not include meaningful patterns (e.g., negative examples). The label represents the ground truth of the training data (e.g., whether the training data is an action pattern leading to a desired result or an action sequence that does not lead to a desired result). The action patterns and action sequences may be input as token identifiers with a positive or negative label.

In one or more embodiments, the machine-learning model is trained by minimizing a loss (calculated by a loss function) between the training label (for example, an action pattern) and the actual predicted value (for example, not an action pattern). Based on the loss determined by a loss function (for example, Mean Squared Error Loss (MSEL), cross-entropy loss, etc.), the training goal is to reduce the error in prediction over multiple epochs or training sessions so that the neural network learns which features and weights are indicative of the correct inferences, given the inputs.

In one or more embodiments, a neural network associated with the pattern detector 140 learns features from the training data input(s) and responsively applies weights to them during training. A "weight" in the context of machine learning represents the importance or significance of a feature or feature value for prediction. For example, each feature is associated with an integer or other real number where the higher the real number, the more significant the feature is for its prediction. In one or more embodiments, a weight in a neural network or other machine learning application represents the strength of a connection between nodes or neurons from one layer (an input) to the next layer (an output). A weight of 0 means that the input will not change the output, whereas a weight higher than 0 changes the output. The higher the value of the input or the closer the value is to 1, the more the output will change or increase. Likewise, there may be negative weights. Negative weights proportionately reduce the value of the output. For instance, the more the value of the input increases, the more the value of the output decreases. Negative weights contribute to negative scores.

In one or more embodiments, subsequent to the neural network training, the machine learning model(s) (for example, in a deployed state) receives one or more of the deployment input(s), such as even sequences. In contrast to training inputs, deployment inputs are not labeled. When a machine-learning model is deployed, it has typically been trained, tested, and packaged to process data it has never processed. Responsively, in one or more embodiments, the deployment input(s) are automatically converted to one or more tokens, as previously described. The machine-learning model makes a prediction using the tokens. In certain embodiments, the prediction(s) is hard (for example, membership of a class is a binary "yes" or "no") or soft (for example, there is a probability or likelihood attached to the labels), which may be expressed as a confidence score.

Returning now to FIG. 1, the action space mapper 142 uses the action telemetry data and state telemetry data 128 to understand the action space. The technology described herein starts with an undefined action space but begins to learn about the action space through random exploration. As actions are taken during testing, both the action taken and the resulting state are communicated to a centralized testing service. The centralized testing service may then begin to build a model of the action space using the action telemetry data and state telemetry data. The model of the action states is built by combining action and sate telemetry data received from the plurality of test machines conducting the testing.

The testing director 144 assigns a testing task to various machines. In aspects, the task is assigned for time duration, such as an hour, and then a new testing task is assigned. Once a plurality of action patterns is identified and, at least, a partial model of the action space is built, the testing on the test machines may be split into different modes. As described previously, a first portion of the test machines may be allocated to random testing, a second portion to replay testing, and a third portion to pioneer testing. Additional portions may be devoted to running action scenarios generated through computationally-derived action scenarios, derived from heuristics, statistical methods, or machine learning algorithms.

Various rules may be used to direct testing resources to different testing modes or differ areas of the software. The testing director 144 evaluates the reward outcome from the past runs and reduces the runtime on the branches with no or few unique rewards in the past. This feature saves test machine capacity. The testing director 144 may evaluate rewards specific to the branch under test to focus the capacity to reproduce the rewards specific to that branch. In one aspect, as the number of rewards hit during random exploration decrease, the amount of resources allocated to random exploration are reduced. Similarly, as fewer new action spaces are discovered, the amount of resources allocated to pioneering and/or random exploration are reduced.

The technology described herein utilizes the learned system space to navigate the system effectively while attempting to achieve states that satisfy reward criteria. The telemetry data from the attempts is used to re-evaluate the models and retrain the technology described herein. The technology described herein starts with random exploration and once it learns how to achieve rewards, it optimizes to focus the capacity around achieving rewards.

Figure 2:
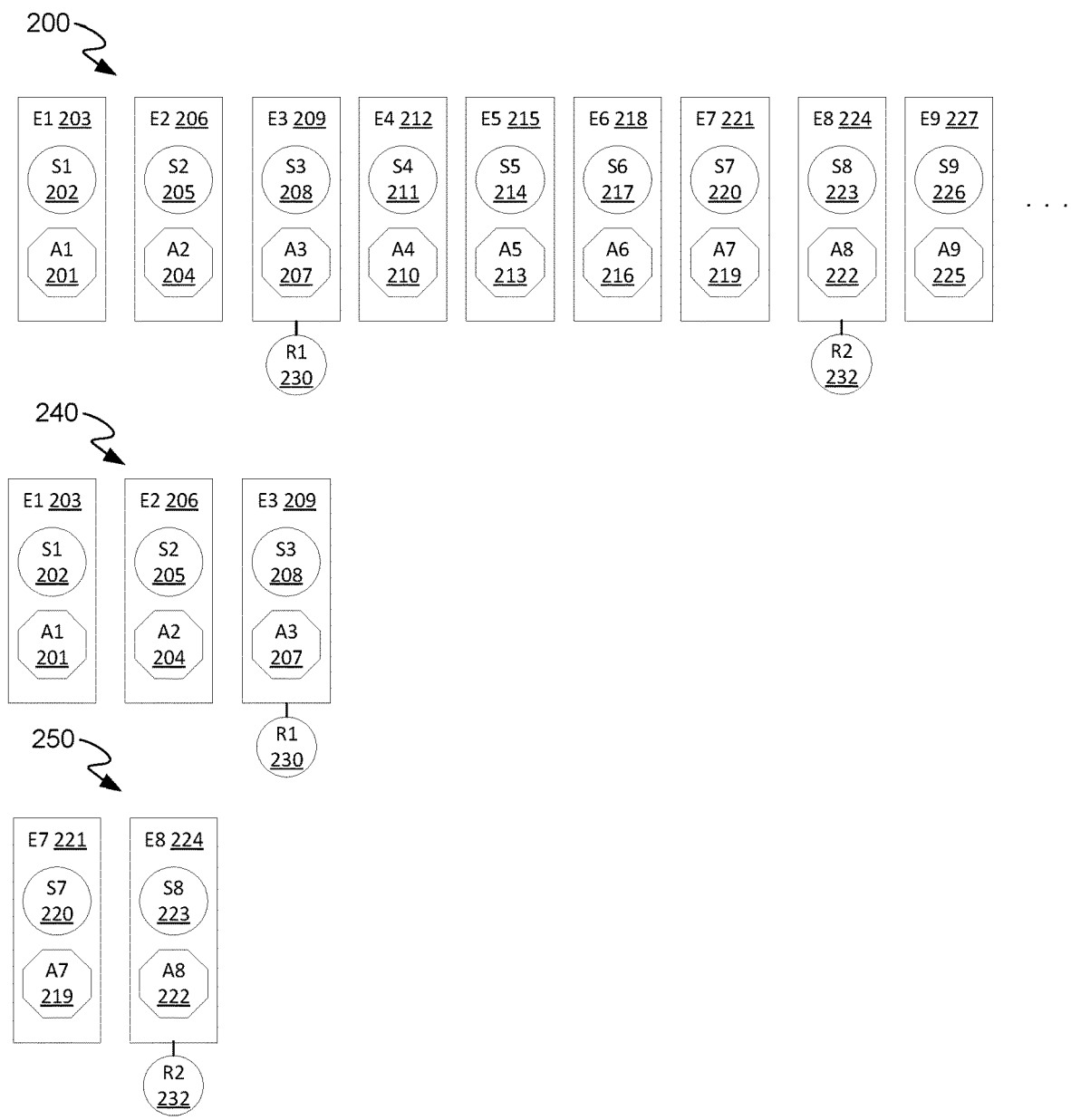
FIG. 2 is a diagram illustrating pattern identification in an example event sequence, in accordance with aspects of the technology described herein.

Turning now to FIG. 2, an example identification of patterns within an event sequence is illustrated, according to aspects of the technology described herein. As described previously, the test platform 130 receives action telemetry data and corresponding state telemetry data for a plurality of actions. The event sequence builder 138 correlates a specific action to a specific resulting state to form an event. The resulting state is the state of the software being tested directly after the action is taken and before a subsequent action is taken. The event sequence builder 138 may use timestamps associated with the action telemetry data and state telemetry data to match a particular action with a particular state to form an event (or otherwise correlate the action and the state). The state is defined by a collection of software and/or system attributes and corresponding values.

FIG. 2 shows an event sequence 200. The event sequence includes a first event 203, a second event 206, a third event 209, a fourth event 212, a fifth event 215, a sixth event 218, a seventh event 221, an eighth event 224, and a ninth event 227. These nine events may be just nine of hundreds, thousands, or more events recorded during testing.

The first event 203 includes a first action 201 and a first state 202. The first state 202 is the state produced by performing the first action 201. For example, if the first action 201 is selecting a save icon, then the first state 202 includes a displayed "save interface" that was not displayed in the previous state. The second event 206 includes a second action 204 and a second state 205. The third event 209 includes a third action 207 and a third state 208. The third event 209 is also associated with a first reward 230. In aspects, a reward is assigned to each state with a higher reward associated with desired states. In other aspects, a reward is only assigned when a state matches a desired state, such as a crashed state, hung state, or other state indicating the presence of a bug or other problem within the software. In other aspects, a reward is also assigned when a state matches a desired state, such as upon the completion of a targeted task within the application, such as saving a file, take a picture, or any other defined task that may be of particular interest to testers.

The fourth event 212 includes a fourth action 210 and a fourth state 211. The fifth event 215 includes a fifth action 213 and a fifth state 214. The sixth event 218 includes a sixth action 216 and a sixth state 217. The seventh event 221 includes a seventh action 219 a seventh state 220. The eighth event 224 includes an eighth action 222 and an eighth state 223. The eighth event 224 is associated with a second reward 232. The second reward 232 indicates that the eighth state 223 is a desired state. The ninth event 227 includes a ninth action 225 ninth state 226.

As described previously, the pattern detector 140 identifies a sequence of actions that produce a desired state. In this example, a first detected pattern 240 includes the first event 203, the second event 206, and the third event 209. The last event in the detected pattern is associated with a reward indicating the achievement of a desired state. The challenge in detecting a sequence of actions that produces the desired state lies in determining which action starts the sequence. The first detected pattern 240 includes three events, but note the second detected pattern 250 includes only two events and that the fourth event 212, the fifth event 215, and the sixth event 218 were determined to be unrelated to producing the eighth state 223. Instead, only the seventh action 219 and in the eighth action 222 were required to produce the eighth state 223. Essentially, the three excluded events are the result of the testing program pursuing what turned out to be a tangent that did not produce the sought after result. As an example, the testing program renamed a document during the fourth event 212, the fifth event 215, and the sixth event 218, which did not produce a desired state. However, the next two actions directed to changing a style in the document produced a crash, which is a desired state to detect during software testing. Assuming for the sake of illustration that the renaming and style change are independent, then only performing the style change operations are needed to generate the crash.

Figure 3:
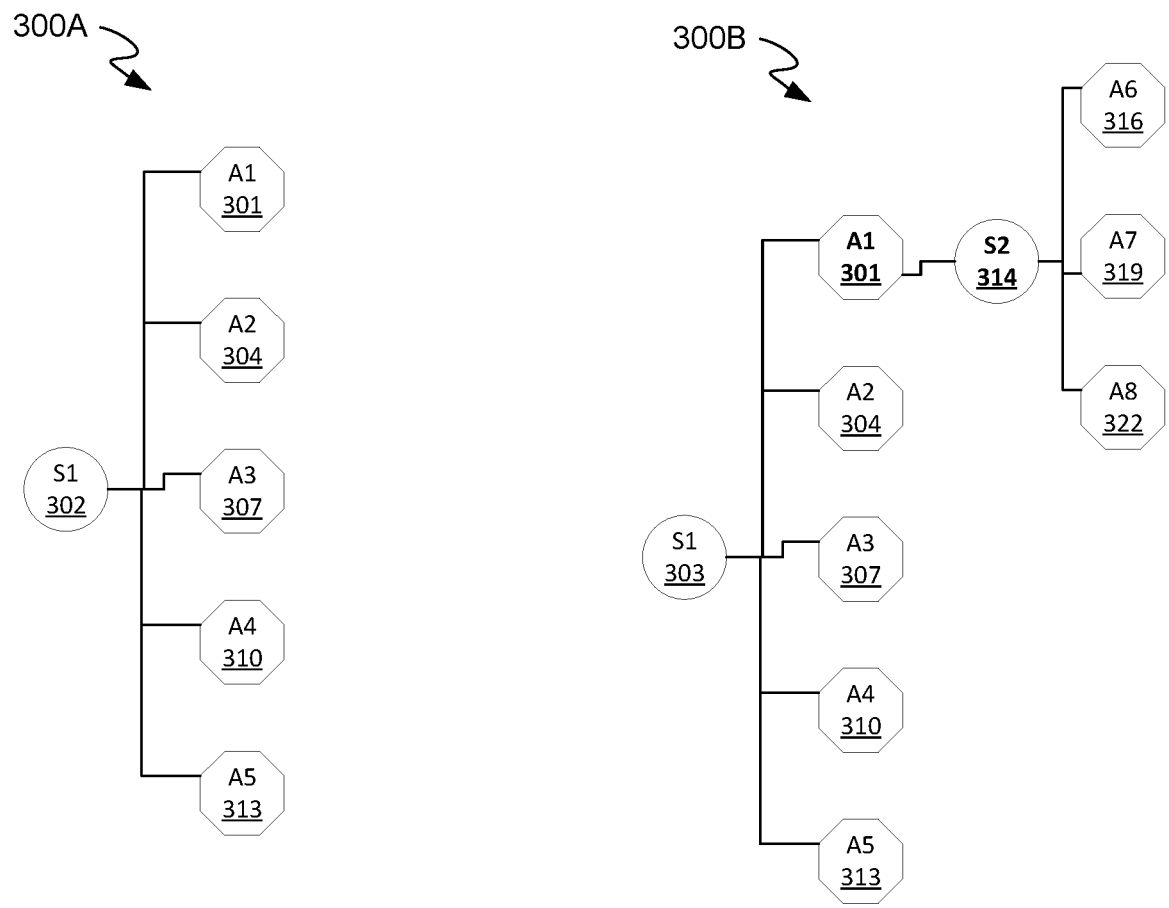
FIG. 3 is a diagram illustrating an example undefined action space, in accordance with aspects of the technology described herein.

Turning now to FIG. 3, an undefined action space is illustrated, according to aspects of the technology described herein. The action space is a collection of actions that may be taken from different user interface states available in a software being tested. In a defined action space, all available actions and the resulting states produced by taking the available actions are provided. In an undefined action space, the actions available to the testing platform outside of the current state are initially unknown to the testing platform. Further, in an undefined action space, the programmed state change that should result (e.g., bolding text, having typed text enter a box, dismissing a dialog box) from taking available actions from the current state is also unknown to the testing platform.

The action space 300A illustrates an undefined action space. The action space 300A includes a first state 302. The first state 302 to a user interface through which five different actions are possible. These actions include the first action 301, a second action 304, a third action 307, a fourth action 310, and a fifth action 313. Note that the resulting state produced by taking any of these five actions is unknown.

The action space 300B illustrates what happens when the first action 301 is taken. In response to taking the first action 301, a second state 314 is produced. Three additional actions may be taken from the second state 314. These three additional actions include a sixth action 316, seventh action 319, and an eighth action 322. As actions are taken, the technology described herein may build a map of the action space. This is part of the learning process. The action space may be used subsequently during testing to run various scenarios. For example, in a pioneering scenario, the client tester takes actions within an unknown portion of the action space with a goal of learning new spaces.

Figure 5:
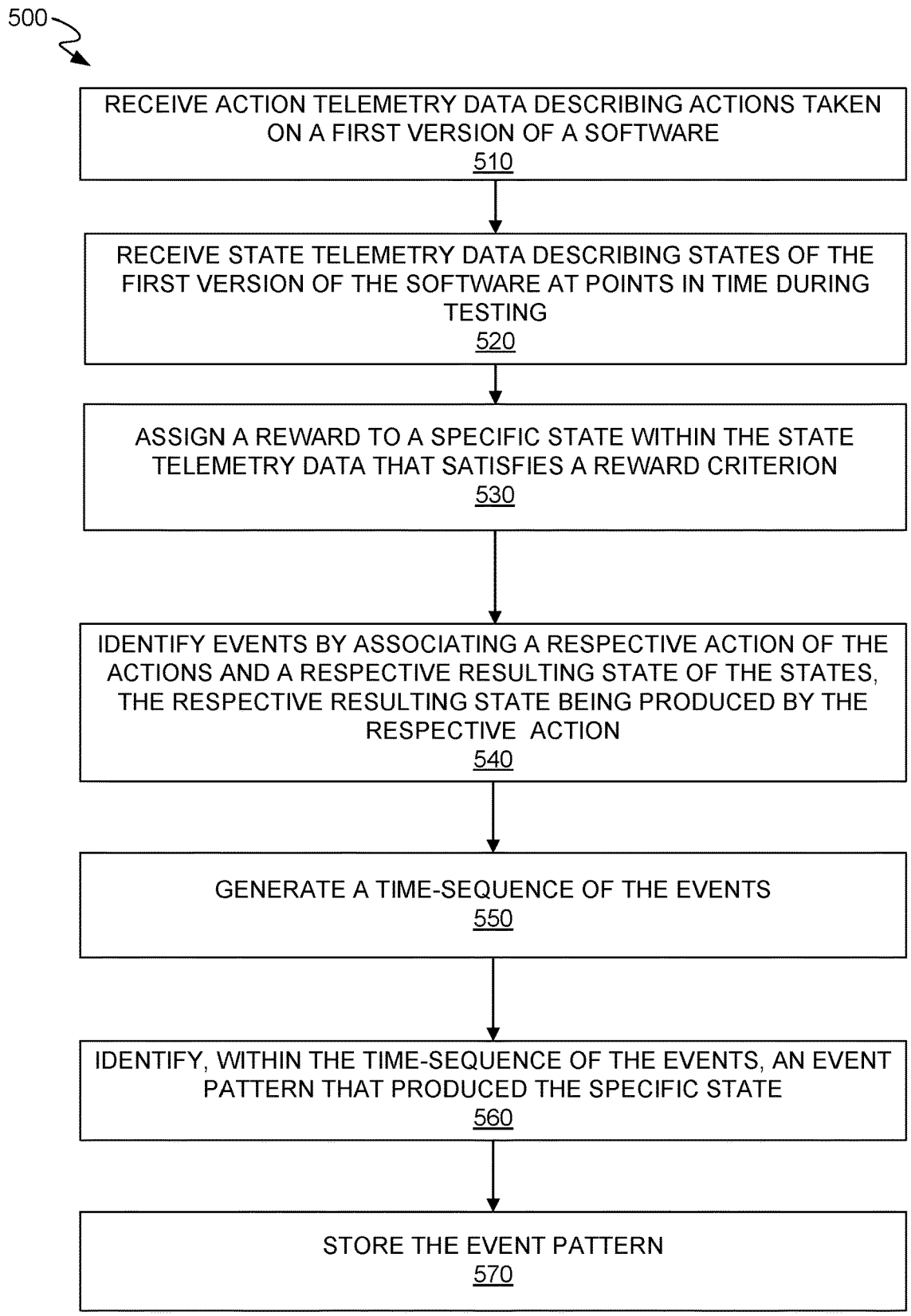
FIG. 5 is a flow chart illustrating an example software testing method, in accordance with aspects of the technology described herein.
Figure 7:
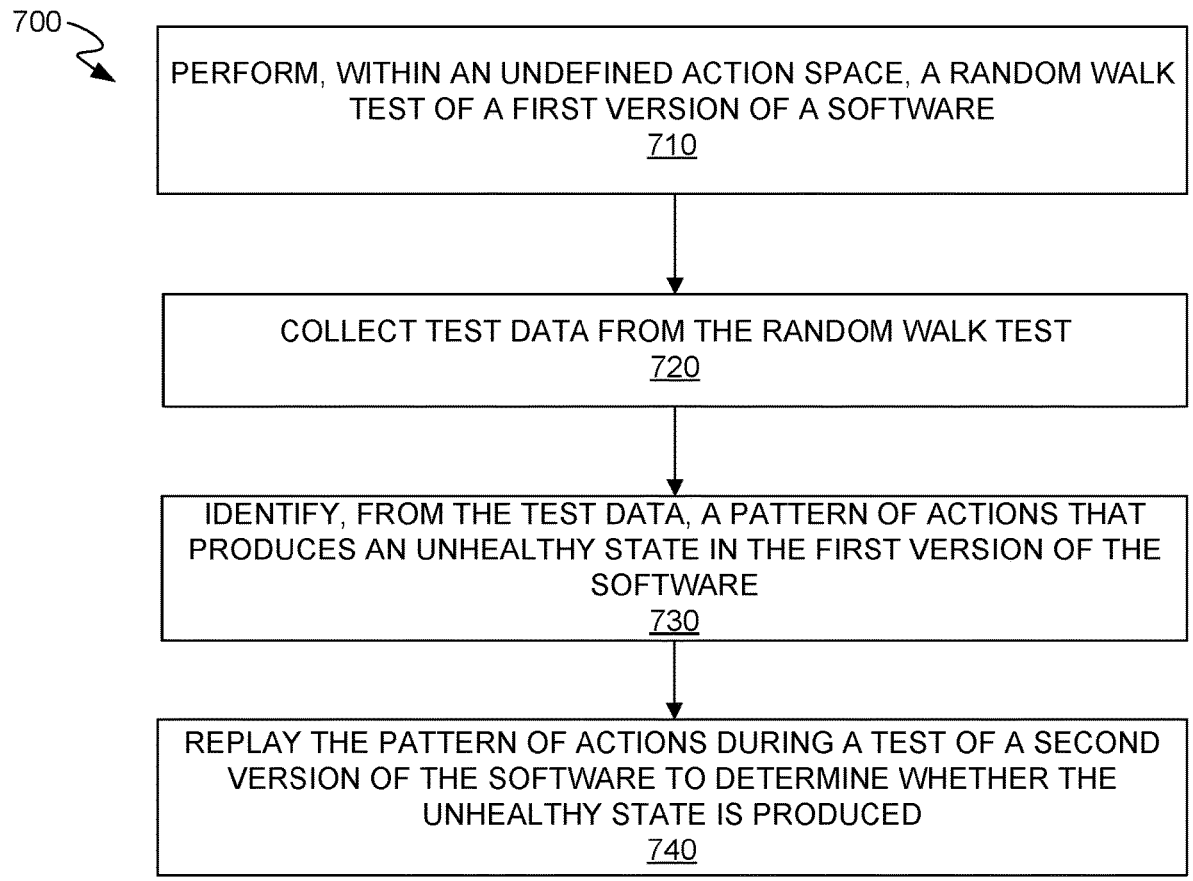
FIG. 7 is a flow chart illustrating an example software testing method, in accordance with aspects of the technology described herein.

Now referring to FIGS. 5-7, each block of methods 500, 600, and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, methods 500, 600, and 700 are described, by way of example, with respect to FIGS. 1-4. However, these methods may additionally or alternatively be executed by any one system, or any combination of systems, including those described herein.

FIG. 5 describes a method 500 of testing software, according to an aspect of the technology described herein. At step 510, the method 500 includes receiving action telemetry data describing actions taken on a first version of a software. The action telemetry data is received from testing agents running on a plurality of test machines. The action telemetry data includes descriptions of actions the various testing agents took on the test machines. Actions include all possible interactive actions with the software's user interface(s). In other words, actions may be any action (e.g., select, hover, enter text) a user may perform with a user interface element (e.g., button, menu, text box). In one aspect, the actions are determined through interrogation of an accessibility layer (e.g., the Microsoft UI Automation System).

At step 520, the method 500 includes receiving state telemetry data describing states of the first version of the software at points in time during testing. The state telemetry data is received from the software on various test machines. The state telemetry data may include new user interface elements presented in response to the action along with other changes (e.g., content change) made to the user interface. The state telemetry data may also include system and software health information, such as whether the system crashed, hung, or the like. In some aspects, the state telemetry data takes the form of an image of the UI that resulted from an action. As described above, in aspects, UI images are collected during action replay when the pattern being replayed is associated with above a threshold confidence score.

At step 530, the method 500 includes assigning a reward to a specific state within the state telemetry data that satisfies a reward criterion. The reward is associated with the state and the action that produced the state. The goal is to test functionality as users experience the functionality in apps and in an operating system shell. The reward function may be formulated differently in different experiments. In first aspect, a positive reward is triggered if the action by the agent taken matches a target action (e.g., when the agent takes the actions of Bold Button, Click Font) or achieves a target state.

At step 540, the method 500 includes identifying events by associating a respective action of the actions and a respective resulting state of the states, the respective resulting state being produced by the respective action The action may be associated with the resulting state through times stamps on the action and resulting state.

At step 550, the method 500 includes generating a time-sequence of the events.

At step 560, the method 500 includes identifying, within the time-sequence of the events, an event pattern that produced the specific state. The event pattern includes actions that produce the specific state while excluding actions that are not required to produce the specific state. As described previously, various machine-learning methods may be used to identify event patterns. These methods include TF-IDF and natural language processing, such as word-embedding methods. Other pattern identification methods may be used to identify the time-sequence of events. Suitable pattern identification methods include, but are not limited to, statistical pattern recognition, neural network pattern recognition, support vector machine pattern recognition, Bayesian pattern recognition, case-based pattern recognition, evolutionary computation pattern recognition, indexed vector pattern recognition, and stochastic numerical optimization.

At step 570, the method 500 includes storing the event pattern. The pattern may be stored for use in future replay testing and/or debugging efforts. For example, if the pattern is based on detecting an unhealthy condition, then the pattern may be used by developers to fix the cause of the unhealthy condition.

FIG. 6 describes a method 600 of testing software, according to an aspect of the technology described herein. At step 610, the method 600 includes receive a time-sequence of events from testing a first version of a software. An event within the time-sequence of events comprises an action and resulting state produced by the action within the first version of the software. Actions and states have been described previously. This information may be received from multiple testing agents and telemetry from software instances being tested.

At step 620, the method 600 includes identify, within the time-sequence of events, an event pattern that produced a specific state that satisfies a specific reward criterion. As described previously, various machine-learning methods may be used to identify event patterns. These methods include TF-IDF and natural language processing, such as word-embedding methods.

At step 630, the method 600 includes instruct a first plurality of test instances to test a second version of the software by reproducing the event pattern. This type of testing is described as replay testing. The goal of replay testing is to determine whether a bug is fixed. The replay testing performs tasks likely to be performed by a real user.

FIG. 7 describes a method 700 of testing software, according to an aspect of the technology described herein. At step 710, the method 700 includes performing, within an undefined action space, a random walk test of a first version of a software. The random walk test has been described previously. In general, the random walk testing randomly selects user interface elements to interact with and randomly selects the type of interaction to attempt.

At step 720, the method 700 includes collecting test data from the random walk test. The test data includes action telemetry data and state telemetry data.

At step 730, the method 700 includes identifying, from the test data, a pattern of actions that produces an unhealthy state in the first version of the software. The unhealthy condition may be detected in the state data.

At step 740, the method 700 includes replaying the pattern of actions during a test of a second version of the software to determine whether the unhealthy state is produced. The replaying is used to determine whether a bug is fixed and to perform actions likely to find bugs in subsequent versions.

Example Distributed Computing Environment

Figure 8:
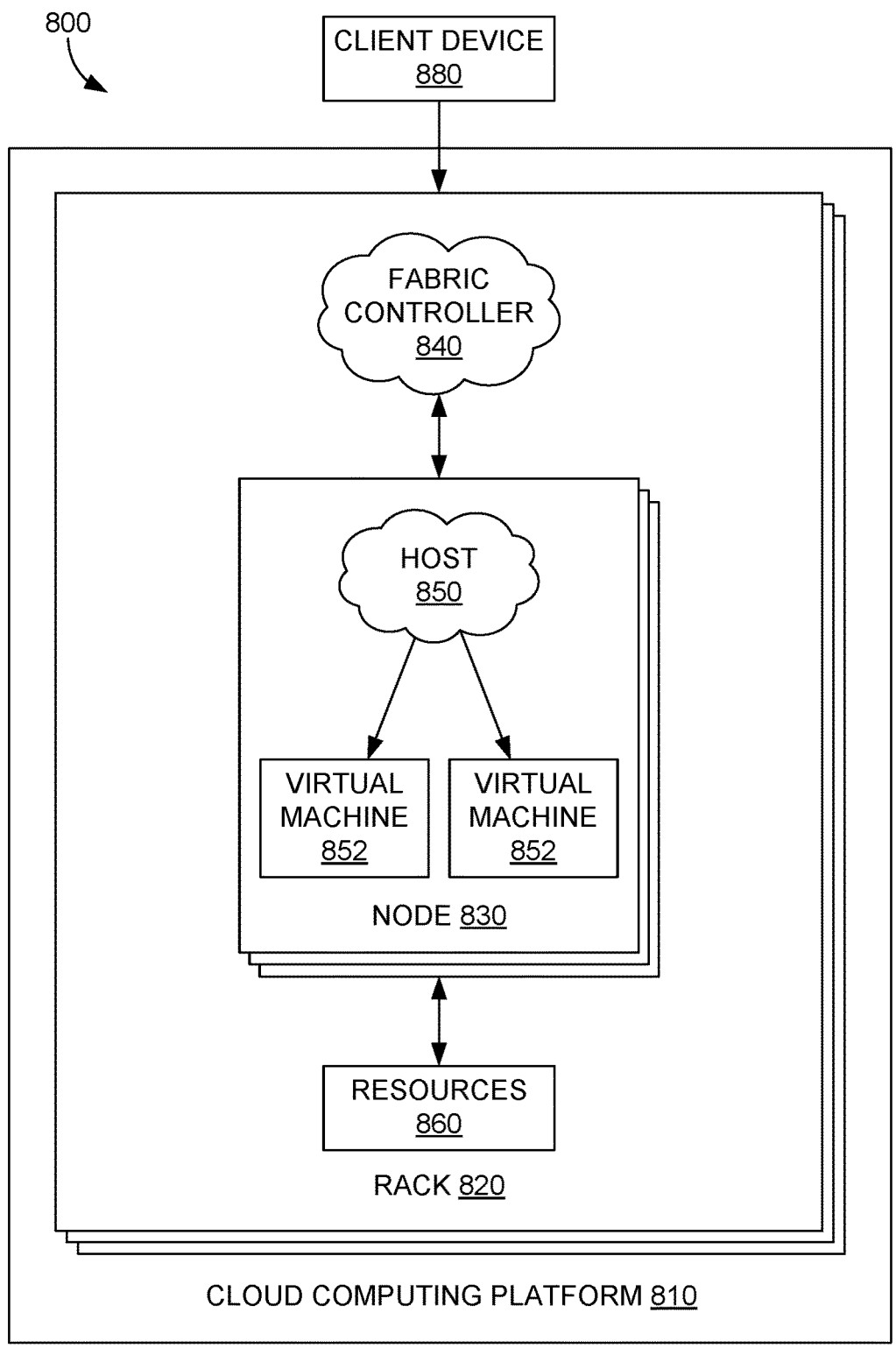
FIG. 8 is a block diagram of an example distributed computing environment suitable for use in implementing aspects of the technology described herein.

Referring now to FIG. 8, FIG. 8 illustrates an example distributed computing environment 800 in which implementations of the present disclosure may be employed. Data centers may support distributed computing environment 800 that includes cloud-computing platform 810, rack 820, and node 830 (e.g., computing devices, processing units, or blades) in rack 820. The system may be implemented with cloud-computing platform 810 that runs cloud services across different data centers and geographic regions. Cloud-computing platform 810 may implement fabric controller 840 component for provisioning and managing resource allocation, deployment, upgrade, and management of cloud services. Typically, cloud-computing platform 810 acts to store data or run service applications in a distributed manner. Cloud-computing platform 810 in a data center may be configured to host and support operation of endpoints of a particular service application. Cloud-computing platform 810 may be a public cloud, a private cloud, or a dedicated cloud.

Node 830 may be provisioned with host 850 (e.g., operating system or runtime environment) running a defined software stack on node 830. Node 830 may also be configured to perform specialized functionality (e.g., compute nodes or storage nodes) within cloud-computing platform 810. Node 830 is allocated to run one or more portions of a service application of a tenant. A tenant may refer to a customer utilizing resources of cloud-computing platform 810. Service application components of cloud-computing platform 810 that support a particular tenant may be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines may also concurrently run separate service applications. The virtual machines or physical machines may be configured as individualized computing environments that are supported by resources 860 (e.g., hardware resources and software resources) in cloud-computing platform 810. It is contemplated that resources may be configured for specific service applications. Further, each service application may be divided into functional portions such that each functional portion is able to run on a separate virtual machine. In cloud-computing platform 810, multiple servers may be used to run service applications and perform data storage operations in a cluster. In particular, the servers may perform data operations independently but exposed as a single device referred to as a cluster. Each server in the cluster may be implemented as a node.

Client device 880 may be linked to a service application in cloud-computing platform 810. Client device 880 may be any type of computing device, which may correspond to computing device 900 described with reference to FIG. 9, for example. Client device 880 may be configured to issue commands to cloud-computing platform 810. In embodiments, client device 880 may communicate with service applications through a virtual Internet Protocol (IP) and load balancer or other means that direct communication requests to designated endpoints in cloud-computing platform 810. The components of cloud-computing platform 810 may communicate with each other over a network (not shown), which may include one or more local area networks (LANs) and/or wide area networks (WANs).

Example Computing Environment

Having briefly described an overview of certain implementations of the present disclosure, an example-operating environment in which embodiments of the present disclosure may be implemented is described below in order to provide a general context for various aspects of the present disclosure. Referring initially to FIG. 9 in particular, an example-operating environment for implementing embodiments of the present disclosure is shown and designated generally as computing device 900. Computing device 900 is but one example of a suitable computing environment and is not intended to suggest any limitation as to the scope of use or functionality described herein. Neither should computing device 900 be interpreted as having any dependency or requirement relating to any one or combination of components illustrated.

The disclosed systems and methods may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The disclosed systems and methods may be practiced in a variety of system configurations, including hand-held devices, consumer electronics, general-purpose computers, more specialty computing devices, etc. The disclosed systems and methods may also be practiced in distributed computing environments where tasks are performed by remote-process sing devices that are linked through a communications network.

Figure 9:
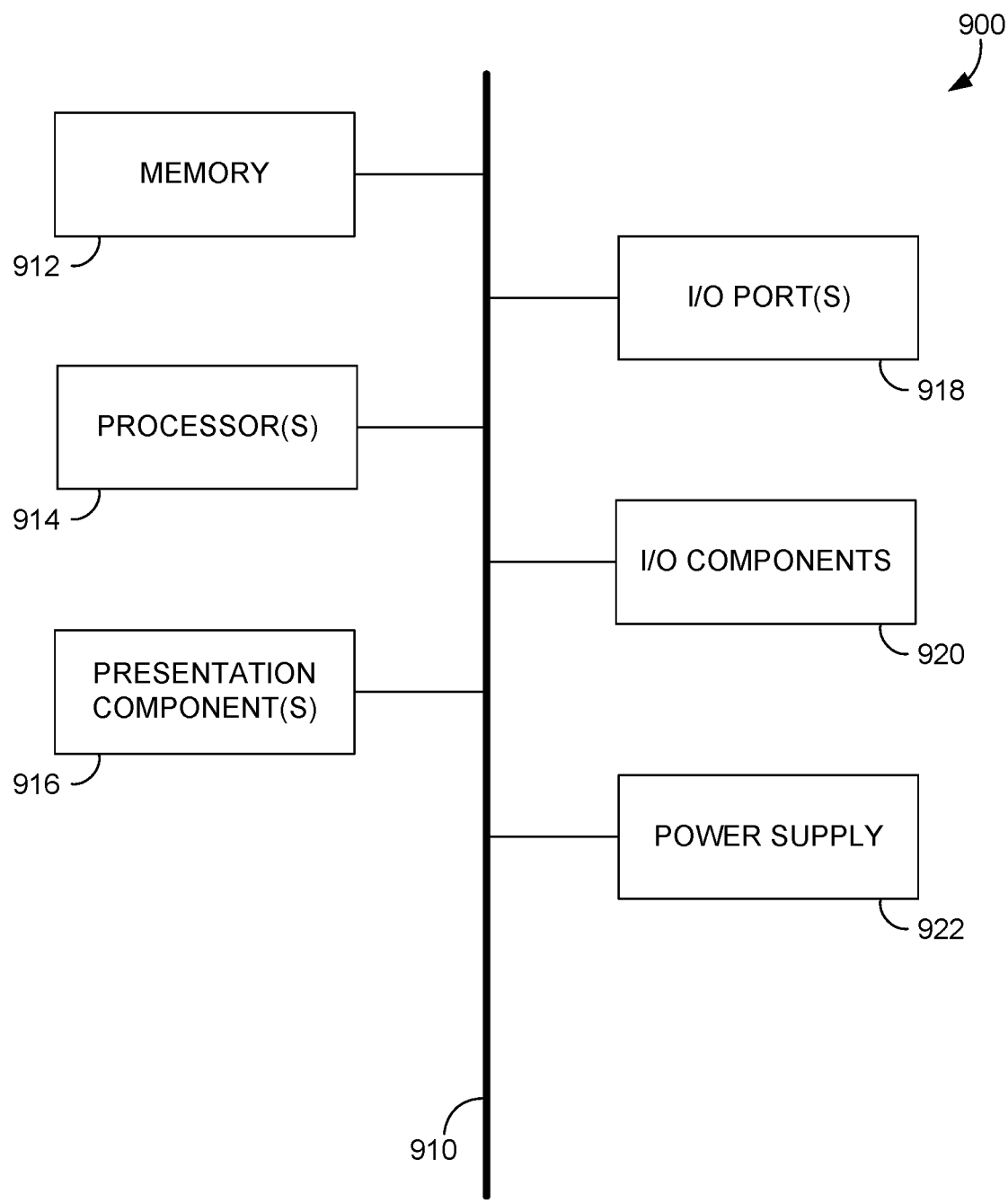
FIG. 9 is a block diagram of an example computing environment suitable for use in implementing aspects of the technology described herein.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents one or more buses (such as an address bus, data bus, or combination thereof). The various blocks of FIG. 9 are shown with lines for the sake of conceptual clarity, and other arrangements of the described components and/or component functionality are contemplated. For example, one may consider a presentation component such as a display device to be an I/O component. Also, processors have memory. As such, the diagram of FIG. 9 is merely illustrative of an example-computing device that may be used in connection with one or more embodiments of the present disclosure. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media may be any available media that may be accessed by computing device 900 and includes both volatile and nonvolatile media, removable and non-removable media. By way of example, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, random access memory (RAM), read only memory (ROM), electrically erasable programmable ROM (EEPROM), flash memory or other memory technology, compact disc ROM (CD-ROM), digital versatile disks (DVD) or other optical disk storage, magnetic cassettes, magnetic tape, magnetic disk storage or other magnetic storage devices, or any other medium which may be used to store the desired information and which may be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. Combinations of any of the above are included within the scope of computer-readable media.

Memory 912 includes computer storage media in the form of volatile and/or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Example presentation components include a display device, speaker, printing component, vibrating component, etc.

I/O ports 918 allow computing device 900 to be logically coupled to other devices including I/O components 920, some of which may be built in. Illustrative I/O components include a microphone, joystick, game pad, satellite dish, scanner, printer, wireless device, etc.

The end-to-end software-based system may operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code may provide more complex functionality to higher levels of software. As used herein, computer-executable instructions includes any software, including low level software written in machine code, higher level software such as application software and any combination thereof. In this regard, the system components may manage resources and provide services for system functionality. Any other variations and combinations thereof are contemplated with embodiments of the present disclosure.

By way of example, the testing environment may include an application program interface (API) library that includes specifications for routines, data structures, object classes, and variables may support the interaction between the hardware architecture of the device and the software framework of the testing environment. These APIs include configuration specifications for the testing environment such that the different components therein may communicate with each other in the testing environment, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) may be used in addition to or instead of those shown.

Embodiments described in the paragraphs below may be combined with one or more of the specifically described alternatives. In particular, an embodiment that is claimed may contain a reference, in the alternative, to more than one other embodiment.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely illustrative. Components can be configured for performing novel aspects of embodiments, where the term "configured for" can refer to "programmed to" perform particular tasks or implement particular abstract data types using code. Further, while embodiments of the present disclosure may generally refer to the testing environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that the disclosure systems and methods are well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method of automated software testing comprising:
   receiving action telemetry data describing actions taken on a first version of a software;
   receiving state telemetry data describing states of the first version of the software at points in time during testing;
   assigning a reward to a specific state within the state telemetry data that satisfies a reward criterion;
   identifying events by associating a respective action of the actions and a respective resulting state of the states, the respective resulting state being produced by the respective action;
   generating a time-sequence of the events;
   identifying, within the time-sequence of the events using natural language processing, an event pattern that produced the specific state; and
   storing the event pattern.

2. The method of claim 1, wherein the action telemetry data is gathered during a random walk of user interface elements generated by the first version of the software.

3. The method of claim 2, wherein the random walk is performed in an undefined action space where a first resulting state produced by taking a first action is unknown when the first action is performed.

4. The method of claim 1, wherein identifying the event pattern comprises providing the events encoded as tokens as input to the natural language processing.

5. The method of claim 4, wherein word embeddings are used in the natural language processing.

6. The method of claim 1, wherein the method further comprises running the event pattern on a second version of the software.

7. The method of claim 1, wherein the specific state is the first version of the software crashing.

8. A computer system comprising:
   a processor; and
   memory configured to provide computer program instructions to the processor, the computer program instructions including a software-testing platform configured to:
   receive a time-sequence of events from testing a first version of a software, wherein an event within the time-sequence of events comprises an action and resulting state produced by the action within the first version of the software;
   identify, within the time-sequence of events, an event pattern that produced a specific state that satisfies a specific reward criterion;
   instruct a first plurality of test instances to test a second version of the software by reproducing the event pattern;
   instruct a second plurality of test instances to perform random walk testing on the second version of the software; and
   instruct a third plurality of test instances to perform pioneering testing on the second version of the software, wherein the pioneering testing explores areas of an action space that have not been explored previously.

9. The computer system of claim 8, wherein the action and the resulting state in the time-sequence of events is gathered by random walking an undefined action space within the first version of the software.

10. The computer system of claim 8, wherein the software-testing platform is further configured to communicate the time-sequence of events to a first machine learning model trained to identify a pattern associated with a first reward criterion and a second machine learning model trained to identify a pattern associated with a second reward criterion.

11. The computer system of claim 8, wherein an action associated with an event in the event pattern is a specific interaction with a user interface element.

12. The computer system of claim 8, wherein the software-testing platform is further configured to build a map of an action space of the first version of the software using the time-sequence of events.

13. The computer system of claim 8, wherein the software-testing platform is further configured to instruct the first plurality of test instances to generate an image of each user interface produced when reproducing the event pattern when the event pattern is associated with a confidence score above a threshold, wherein the confidence score indicates a strength of pattern identification.

14. The computer system of claim 8, wherein the action is specific interaction with a user interface element.

15. The computer system of claim 8, wherein the specific state is a crash.

16. A computer storage medium storing computer-useable instructions that, when used by a computing device, cause the computing device to perform operations comprising:

performing, within an undefined action space, a random walk test of a first version of a software;

collecting test data from the random walk test;

communicating the test data to a first machine learning model trained to identify a pattern associated with a first unhealthy state and a second machine learning model trained to identify a pattern associated with a second unhealthy state;

identifying, from the first machine learning model or the second machine learning model, a pattern of actions that produces an unhealthy state in the first version of the software; and replaying the pattern of actions during a test of a second version of the software to determine whether the unhealthy state is produced.

17. The computer storage medium of claim 16, wherein an action in the pattern of actions is a specific interaction with a user interface element.

18. The computer storage medium of claim 16, further comprising mapping the undefined action space using the test data.

19. The computer storage medium of claim 16, further comprising generating screen shots of each user interface produced when replaying the pattern of actions when the pattern is associated with a confidence score above a threshold, wherein the confidence score indicates a strength of pattern identification.

20. The computer storage medium of claim 16, wherein the pattern is detected using natural language processing that receives as input the pattern of actions encoded as tokens.

* * * * *